United States Patent [19]

Diggs

[11] 4,019,581
[45] Apr. 26, 1977

[54] METAL BUILDING WITH COMBINED TEMPERATURE CONTROL AND FIREFIGHTING SYSTEM

[76] Inventor: Richard E. Diggs, South 12A Road, Carthage, Mo. 64836

[22] Filed: Dec. 18, 1975

[21] Appl. No.: 641,906

Related U.S. Application Data

[63] Continuation-in-part of Ser. No. 604,663, Aug. 14, 1975.

[52] U.S. Cl. .................................. 169/16; 169/41; 239/209
[51] Int. Cl.[2] ......................................... A62C 37/14
[58] Field of Search ............. 239/208, 209; 198/31; 169/41, 16, 5, 54

[56] References Cited
UNITED STATES PATENTS

| | | | |
|---|---|---|---|
| 2,734,583 | 2/1956 | Milan | 239/209 X |
| 2,809,074 | 10/1957 | McDonald | 239/209 |
| 3,050,134 | 8/1962 | Multin | 239/209 X |
| 3,253,657 | 5/1966 | Job | 169/41 X |
| 3,415,024 | 12/1968 | Kotlarz | 98/31 UX |
| 3,464,172 | 9/1969 | McGee, Jr. | 239/209 X |
| 3,837,405 | 9/1974 | Huddle | 239/209 X |
| 3,939,914 | 2/1976 | Carroll | 169/16 |

Primary Examiner—Evon C. Blunk
Assistant Examiner—Michael Mar
Attorney, Agent, or Firm—Shoemaker and Mattare, Ltd.

[57] ABSTRACT

A metal building with combined temperature control and firefighting system, wherein the building includes a metal frame structure having hollow members defining water flow passages for circulation of water throughout the building structure to heat or cool the building, depending upon whether hot or cold water is circulated, and having heat responsive devices and water distribution devices connected therewith, whereby in the event of a fire, water is caused to flow over portions of the building surface and through the frame members, to prevent damage or destruction thereto due to heat from the fire.

7 Claims, 16 Drawing Figures

METAL BUILDING WITH COMBINED TEMPERATURE CONTROL AND FIREFIGHTING SYSTEM

BACKGROUND OF THE INVENTION

This application is a continuation-in-part of Ser. No. 604,663, filed Aug. 14, 1975.

This invention relates to metal buildings, particularly of the pre-engineered type comprising bolted together metal columns and beams with metal panels secured thereto. This type of building structure grew significantly in popularity during the 1950's, and it possesses many advantages. For example, the building is relatively economical and may be constructed relatively quickly and easily with relatively unskilled labor. However, such buildings are relatively difficult to heat and maintain comfortably warm in cold climates. Also, such buildings can suffer serious damage due to fire, and the insurance on the building and contents is quite high. This is due, at least in part, to the fact that the metal components of the building quickly lose their strength and buckle or collapse when subjected for relatively short times to the temperature associated with a fire.

Typical heating systems for metal buildings utilize the circulation of heated air, and in some instances, infra-red heaters are used. However, it is relatively costly to heat such buildings with either of these methods, since metal buildings are generally not well insulated and large heat losses through the walls and roof of the building are experienced, and moreover, when circulated hot air is used for heating buildings, large amounts of heat are lost through open doors and the like, and considerable time is required in order to bring the temperature of the building back to comfortable levels. Infra-red heaters, on the other hand, are relatively expensive to install and require relatively large amounts of energy to operate. Additionally, with conventional heating systems extensive ductwork or plumbing and the like must be provided in the building for circulation of hot air or hot water and the like to radiators or grids provided in the building. All of these factors contribute both to the initial cost of the building and to the cost of maintaining and operating the same. Moreover, elaborate and expensive firefighting equipment is frequently provided in such buildings, and the most common type of firefighting system comprises sprinklers and associated plumbing and pumps and the like. However, such systems do little to protect the metal components of the building itself, and in fact, sprinklers can cause severe damage to the contents of the building.

There are various firefighting systems known in the prior art for maintaining metal components in metal buildings cool, or for discharging water onto a fire. For example, see any of U.S. Pat. Nos. 273,556, 472,746, 1,644,603, 2,416,284, 2,530,001, 2,803,318, 3,050,134, 3,464,172, 3,616,583, 3,837,126 and 3,837,405.

It will be noted that none of these patents discloses or suggests either the particular water circulating system or associated firefighting apparatus or a combined building heating and firefighting system as taught by the present invention.

The present invention provides a unique integrated heating system with the metal building structure, wherein separate heating ducts and the like are not required, and wherein relatively small, inexpensive and efficient heating units or boilers are sufficient to maintain the temperature in the building at a comfortable level. More particularly, in accordance with the present invention a unique integrated heating system is provided, wherein a relatively small hot water boiler is connected with suitable piping, including heating grids embedded in the floor of the building, and with the heating grids connected with the support columns and roof beams of the building, and wherein the columns and roof beams are constructed with hollow interiors for circulation of hot water therethrough, such that water heated by the boiler is circulated through the columns and beams and through the grids in the floor to heat the building primarily through radiant energy to thus obtain a substantially uniform temperature throughout the interior space of the building. Moreover, with the unique heating system provided by the invention, the structural steel members of the frame of the building and the concrete floor thereof are heated and water is used as the heat exchange medium. All of these elements retain heat for a period longer than air, and accordingly, once a desired temperature is obtained, the residual heat in these elements will maintain the temperature for an extended period of time. Accordingly, operation of the heater or boiler is required only at relatively infrequent intervals, as compared with prior art systems. A further advantage of this unique heating system is that open doors and the like do not affect temperature within the building as drastically as prior art systems utilizing circulated hot air. Moreover, the metal components of the building and the floor and the like are all warm, thus adding to the comfort of the interior of the building. Still further, the unique arrangement of components of the heating system of the invention enables different areas of the building to be heated to different temperatures, to thus obtain the most comfortable and efficient temperature relationships throughout the building. For example, in some areas a lower temperature may be required for comfort than in other areas of the building, and also, the northern portion of the building or that portion thereof exposed to the more severe weather conditions may require a greater temperature input than other portions of the building to maintain a substantially uniform and comfortable temperature level throughout the building.

In fact, in a building constructed in accordance with the present invention, a boiler or heater having a capacity normally used to heat a home having approximately 2,000 square feet of living space was utilized to effectively maintain a comfortable temperature in a metal building having approximately 31,000 square feet of floor space. Moreover, with this invention it was found that during even the coldest winter months the boiler or burner only operated for approximately 4 hours out of a 24 hour period, and yet maintained adequate temperature levels. The result with the building constructed in accordance with the present invention was a savings of approximately 70% in fuel costs, along with a greater degree of comfort in the building, and in fact, it is estimated that the savings realized by the heating system of the invention will actually pay for the cost of construction of the building in approximately 10 years.

Most importantly in the present application, the hot water heating system also serves to keep the metal structural members of the building cool in the event of a fire in the building, and thus damage to the structural elements is prevented. This unique advantage is obtained without expensive sprinkler systems or add-on water circulating devices, as in some prior art arrangements. Still further, unique water discharge means are associated with the water circulating means to discharge water onto the building structural members which do not have provision for circulation of water therethrough.

With a building having the combined heating and firefighting system according to the invention, insurance rates are much lower and fire damage to the building is practically eliminated.

OBJECTS OF THE INVENTION

Accordingly, it is an object of this invention to provide a unique metal building structure wherein the metal frame of the building and the floor of the building are utilized as a part of the radiant heat system for heating the interior of the building, and wherein water is circulated through these members for heating the building, the circulated water also keeping the metal members cool in the event of a fire and thus preventing damage thereto.

Another object of the invention is to provide a metal building construction having metal support columns and roof beams, and wherein the support columns and roof beams are constructed with hollow interiors for circulation of heated water therethrough to heat the interior of the building, and wherein the circulated water keeps these members cool in the event of a fire.

A further object of the invention is to provide means in communication with a source of water circulated through the metal frame of a metal building, which means is responsive to the heat of a fire to release water onto other structural members of the building to keep them cool in the event of a fire.

A still further object of this invention is to provide a frangible heat vent means in the roof of a building which ruptures or melts and the like when subjected to the heat of a fire to vent heat from the interior of the building and thus protect other elements of the building from the intense heat which might otherwise develop.

DETAILED DESCRIPTION OF THE PREFERRED EMBODIMENT

In the drawings, wherein like reference numerals indicate like parts throughout the several views, a building in accordance with the present invention is indicated generally at 10 and comprises a concrete floor 11 and frame 12, including inclined tubular roof beams or rafter beams 13, ridge beams or adaptors 14, upright center columns 15 and upright haunch columns 16 at the sides of the building and supporting the roof beams and adaptors or ridge beams. The columns 15 and 16 are supported at their lower ends on concrete footers 17 and 18, respectively. The building includes an extended portion 19 on one side thereof, including An extended floor portion 11' extends beneath the extended portion 19 of the building.

Suitable wall panels 20 and roof panels 21 of metal and the like are suitably secured to the frame in a conventional manner to enclose the building, and a layer of sprayed on fiber insulation 22 may be applied to the interior surface of the building to insulate the walls and roof thereof and prevent excessive heat transfer therethrough. If desired, and in the preferred embodiment, the insulation is applied to varying thicknesses, so as to obtain a substantially uniform heat loss or insulation factor throughout the height of the building.

Figure 1:
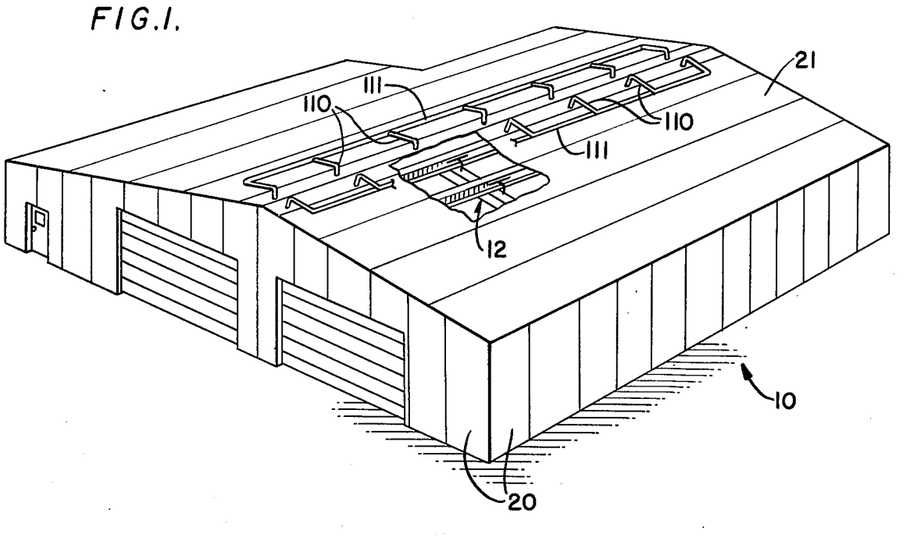
FIG. 1 is a top perspective view of a metal building having the combined heating and firefighting system in accordance with the invention.
Figure 2:
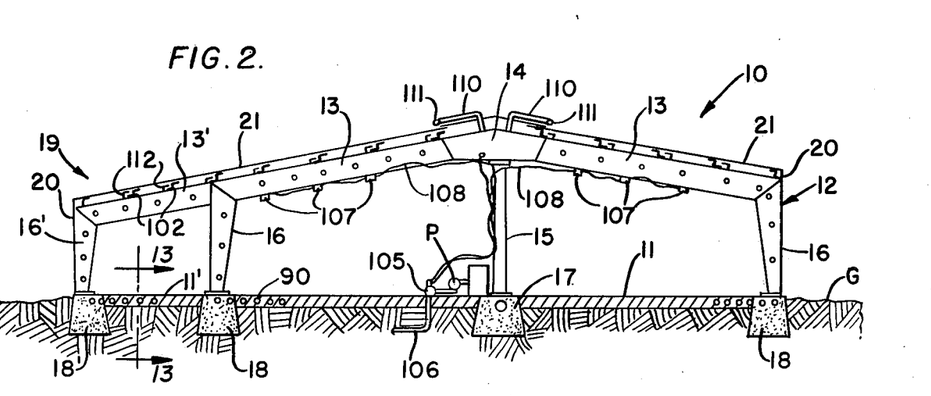
FIG. 2 is a transverse view in section of the building of FIG. 1.
Figure 7:
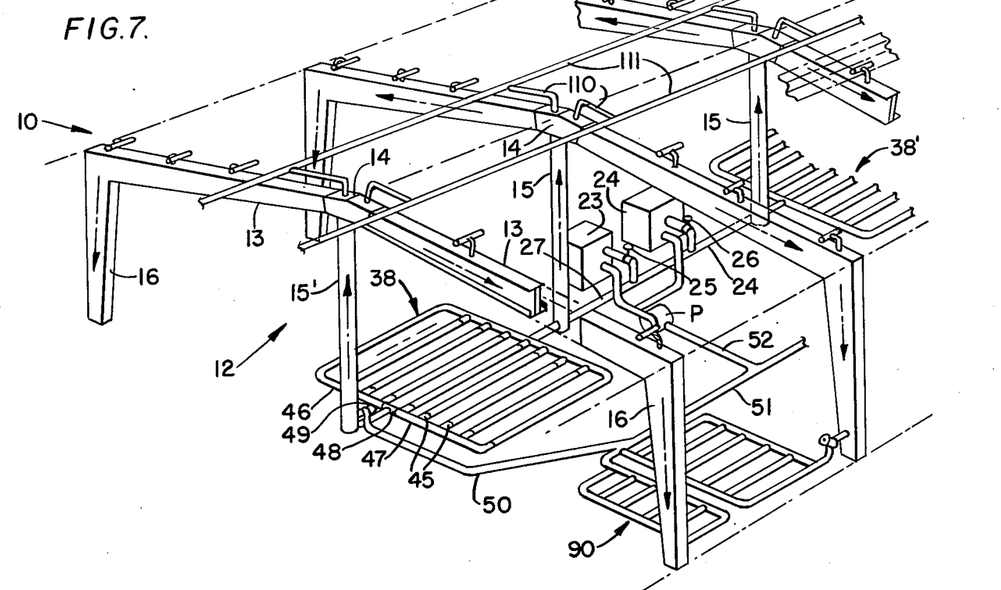
FIG. 7 is a perspective view of the frame and piping assembly for the building according to the invention.

The overall heating and fire control system for the building is seen best in FIGS. 2 and 7. The heating and fire control or firefighting system of the invention is integrated into the structure of the building, and utilizes hot water as the heat exchange medium for heating the building. The water is heated in a pair of boilers 23 and 24 of any suitable conventional type, as, for example, gas fired or electrically heated and the like, and in a preferred embodiment, each boiler has a capacity and is of the type sufficient to normally heat a house having about 2,000 square feet of living space. One of the boilers in the building of the invention serves as a backup for the other boiler, whereby in the event of failure of one of the boilers, freezing of the building can be prevented by using the backup boiler. The boilers are connected through suitable valves 25 and 26 for controlling flow from the boilers, with supply pipes 27 and 28 joined to adjacent center columns 15 for flow of hot water from one or the other or both of the boilers through the pipes 27 and 28 to the columns 15. The columns are hollow, and in a preferred embodiment, comprise 6 inch structural steel pipe. The connection of the supply pipes 27 and 28 with the columns 15 is identical and details of the connection of pipe 27 with column 15 are shown in FIGS. 3 and 5.

During construction of the footer 17, a bearing pad and pipe connection assembly 29 is supported at the upper end of the form for the footer 17, and the assembly includes a rectangularly shaped metal bearing pad 30 having an orifice or opening 31 through the center thereof, and a plurality of anchor bolts 32 secured thereto and depending therefrom. Cross braces or ties 33 are welded or otherwise suitably secured to the lower ends of the anchor bolts 32 for forming a secure anchor with the concrete in the footer 17 when the concrete is cured. Also, a 3 inch standard T 34 is welded to the underside of the bearing pad 30 and the supply pipe 27 is threadably joined thereto. An outlet pipe 35 is threadably connected to the other end of T 34 and extends outwardly of the footer 17 on the side thereof opposite supply pipe 27 for continuing the flow of hot water beyond column 15. The column 15 has a bearing plate 36 welded or otherwise suitably affixed to the bottom end thereof, and a sealing gasket 37 of a rubber asbestos material or the like, preferably reinforced with a wire mesh, is sandwiched between the plates 30 and 36.

Figures 3, 4, 5, 6:
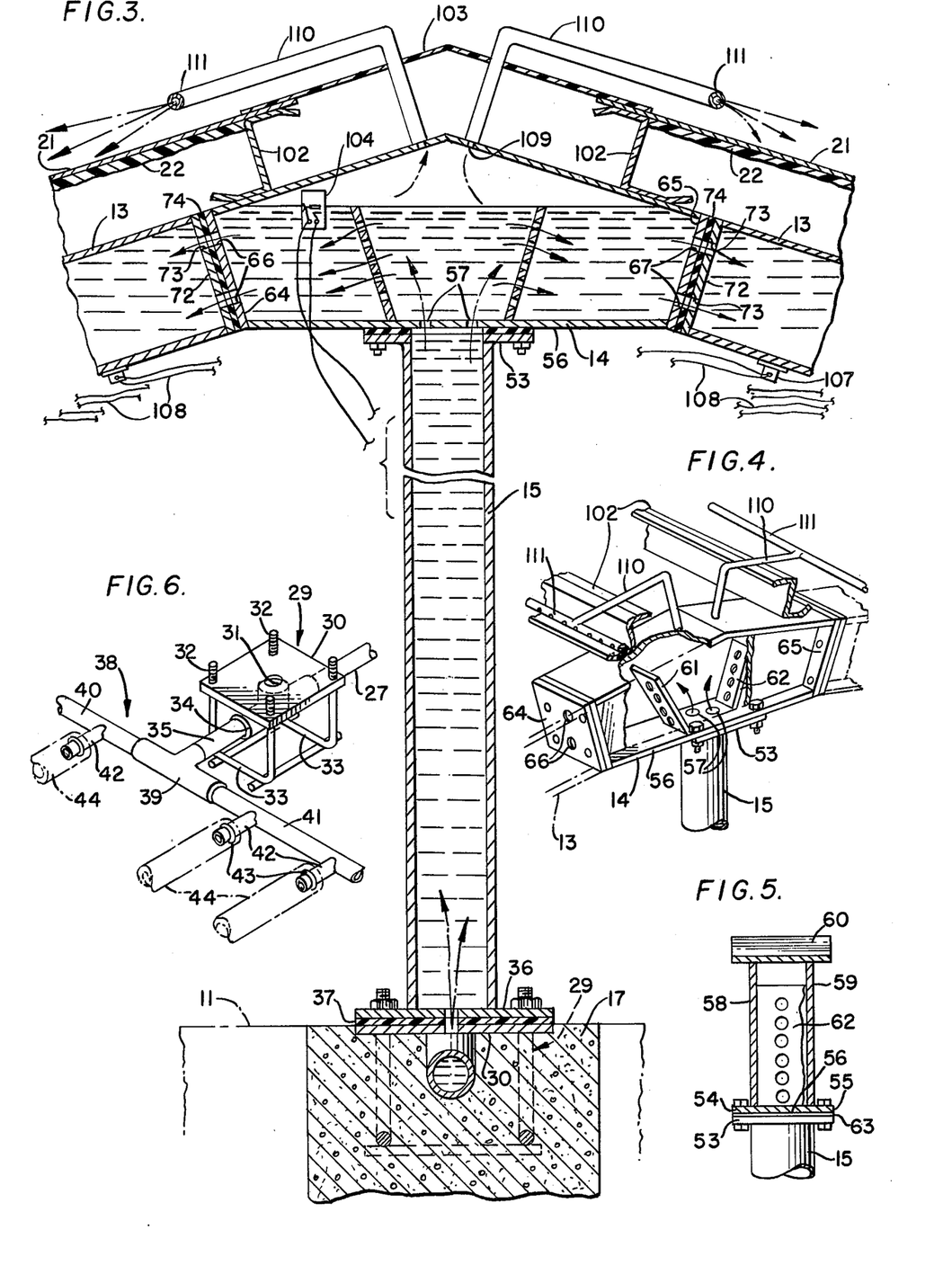
FIG. 3 is a greatly enlarged, fragmentary view in section of a portion of the building of FIG. 1, showing one of the center columns and the center portion of the roof beam.
FIG. 4 is a fragmentary, perspective view, with portions broken away, of a ridge beam or adaptor and portions of related structure.
FIG. 5 is a view in section of the ridge beam or adaptor of FIG. 4.
FIG. 6 is a fragmentary, perspective view of a bearing pad and pipe connection assembly used at the bottom of the center columns 15.

As seen in FIG. 3, the upper surface of bearing pad 30 is disposed substantially flush with the upper surface of the footer 17.

The pipe 35, after exiting from the first footer 17, is connected with a heating grid 38 embedded in the floor 11 and comprising a T fitting 39 having oppositely extending supply header pipes 40 and 41 secured thereto. Each of the supply header pipes has a plurality of laterally extending, relatively short slip connectors or nipples 42 welded or otherwise suitably affixed thereto in substantially equally spaced apart relationship. An O-ring 43 is fitted around each of the nipples 42 and a heat grid tube 44 is slipped over each of the nipples in telescoped, snug fitting, sealed relationship thereto. The other ends of the heat grid tubes 44 are similarly sealingly received over nipples 45 welded to and projecting from oppositely extending manifold pipes 46 and 47 projecting from opposite sides of a T fitting 48, which is connected with an assembly 29 in a subsequent footer 17 beneath the next adjacent column 15. Accordingly, hot water leaving the grid 38 enters the assembly 29 in footer 17 and a portion thereof flows upwardly through column 15, while the remainder thereof flows outwardly into a subsequent grid 38 between the next adjacent pair of columns. The flow continues accordingly through subsequent grids 38 and upwardly through columns 15 to the endmost column 15' at the end of the building. A bypass valve 49 is in the pipe between the last grid 38 and last or endmost column 15', and a bypass pipe 50 is connected therewith and extends to a return pipe 51, whereby upon manipulation of the valve 49, the flow of hot water exiting the last grid 38 is diverted through bypass pipe 50 and to the return pipe 51 and thence back through pipe 52 to a pump P, which is in turn connected with boilers 23 and 24 for effecting circulation of the water in the heating system.

A substantially identical arrangement is provided at the other end of the building, wherein a plurality of heating grids 38' are provided between adjacent columns 15 and a bypass pipe is connected with a return pipe for returning water from the grid directly to the pump P and boiler or boilers 23 and 24.

The upper ends of the columns 15 each has a bolt flange 53 welded otherwise suitably secured thereto, and the flanges 53 on the columns 15 are bolted to the opposite side edge portions 54 and 55 of the bottom wall 56 of the ridge beams or adaptors 14. A pair of openings 57 are formed through the bottom wall 56 in communication with the hollow interior of the column 15 for flow of water upwardly from the column into the hollow interior of the adaptor or ridge beam 14.

As seen best in FIGS. 3, 4 and 5, the ridge beam or adaptor comprises the bottom wall 56 and a pair of substantially parallel, spaced apart side walls 58 and 59. A top wall 60 is welded to the upper edges of side walls 58 and 59 and has oppositely downwardly sloping sides of the desired pitch of the roof in the assembled building.

A pair of flow control orifice plates 61 and 62 are secured in the space between side walls 58 and 59 on opposite sides of the openings 57 for controlling flow outwardly to opposite ends of the ridge beam 14.

A gasket 63, similar to gasket 37, is interposed between the upper end of column 15 and the bottom wall 56 or ridge beam or adaptor 14. Opposite ends of ridge beam 14 are closed by bolt plates 64 and 65 having openings 66 and 67 therethrough for flow of water outwardly from the ridge beam 14 into the roof beams or rafter beams 13.

Figure 8:
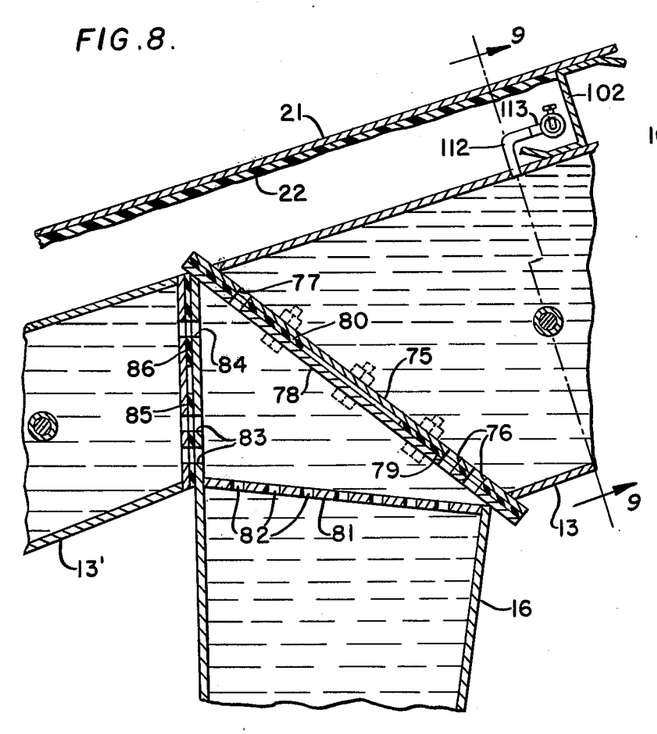
FIG. 8 is a greatly enlarged, fragmentary view in section of the juncture between one of the roof beams and haunch columns of the frame in FIG. 7.
Figure 9:
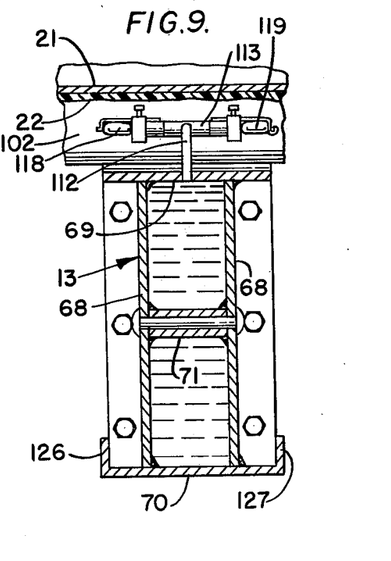
FIG. 9 is a view in section taken along line 9—9 in FIG. 8.

As seen in FIG. 9, the rafter beams 13 each comprises a pair of substantially parallel, elongate, spaced apart side walls 68 having top and bottom walls 69 and 70 welded thereto. The side walls 68 are maintained in predetermind spaced apart relationship during assembly by means of spacers 71 secured between the side walls 68. The upper ends of the beams 13 have bolt flanges 72 welded thereto, with openings 73 therethrough in registry with the openings 66 and 67, respectively, at the respective end of the ridge beam 14, and sealing gaskets 74 are sandwiched between the end plates or flanges 64 and 65 or the ridge beam 14 and the end plates 72 of the rafter beams 13. The lower ends of the rafter beams 13 are closed by angularly disposed plates 75 having a pair of spaced openings 76 therethrough near the lower end thereof for flow of water from the rafter beam 13 into a haunch column 16, and an opening 77 through an upper end portion thereof for flow of air therethrough to prevent an airlock from forming in the beams and columns. The upper end of the haunch column 16 is similarly closed by a similar plate 78 having openings therethrough aligned with openings 76 and 77 and sealed relative thereto by means of gaskets 79 and 80 interposed between the plates 75 and 78. An orifice plate 81 is secured in the upper end portion of each haunch column 16, and the orifice plates have a plurality of openings or orifices 82 formed therethrough, with the orifices being of a larger size as the distance of the haunch column from the pump increases, so that a substantially uniform flow is obtained throughout the system, regardless of the distance from the circulating pump.

Figure 15:
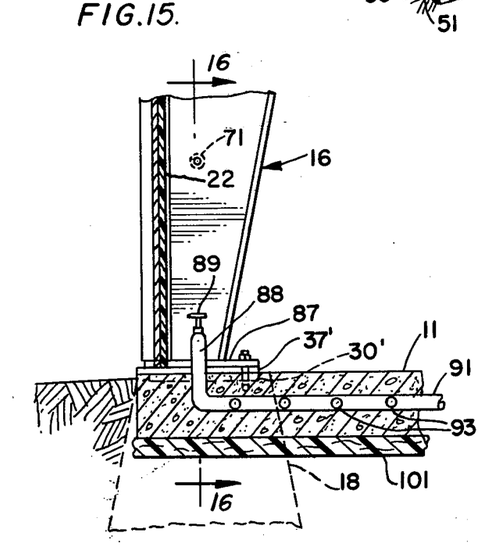
FIG. 15 is an enlarged, fragmentary, sectional view of the lower end of a haunch column and its juncture with the floor.
Figure 16:
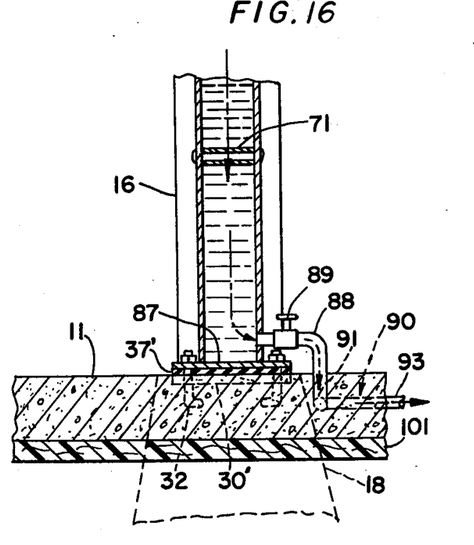
FIG. 16 is a view in section taken along line 16—16 in FIG. 15.

The outer upper end portion of the haunch columns 16 in the area adjacent the building extension 19 have openings 83 and 84 in registry with like openings in an adjacent end of the rafter beams or roof beams 13' of the extension for flow of water from haunch column 16 into the extended or extension rafter beams 13'. The openings 83 and 84 are suitably sealed by means of gaskets 85 and 86 sandwiched between the haunch column 16 and adjacent end of rafter beam 13'. The lower ends of the haunch columns 16 have plates 87 secured thereto as by welding or the like, and the plates 87 are supported on the secured to anchor plates or support pads 30' cast into the upper end portion or surface of footers or piers 18, similarly to the arrangement at the center columns 15. However, rather than the T fitting 34, as used with the center columns, a pipe 88 extends out from the side of the lower end portion of haunch column 16 and has a valve 89 therein for controlling flow therethrough to a heating grid 90 at the side of the building.

Figure 14:
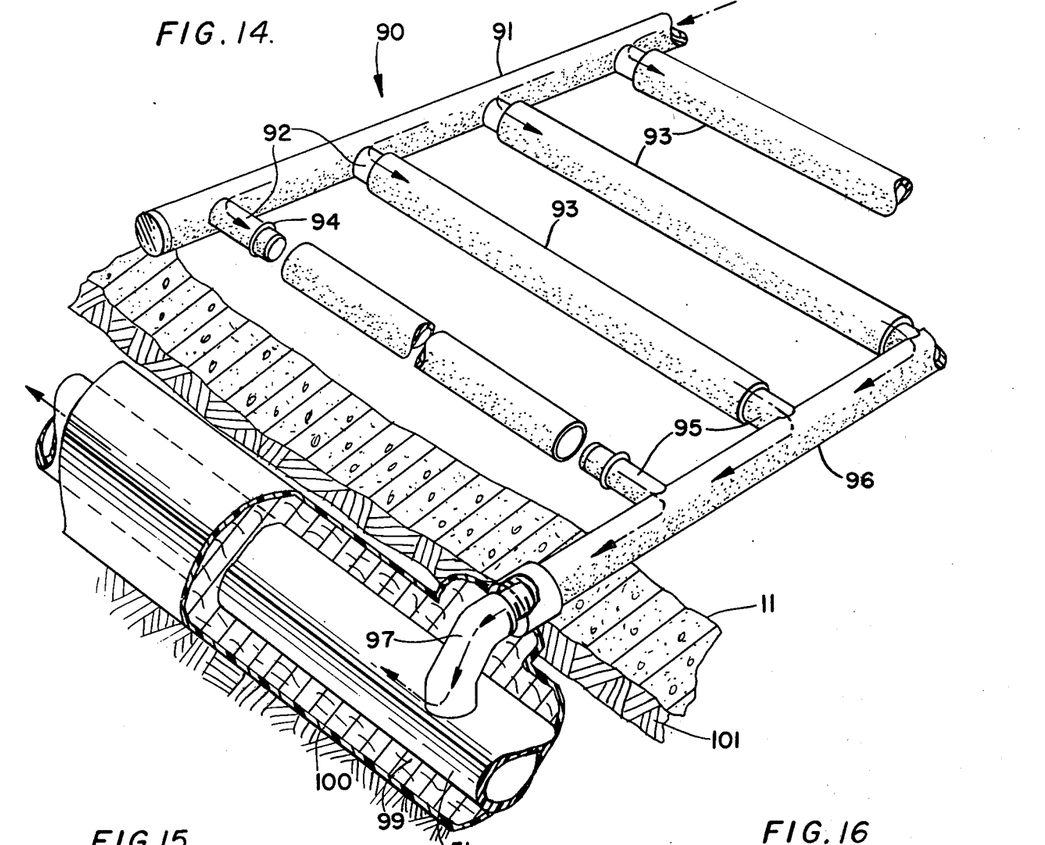
FIG. 14 is a perspective view of a portion of the heating system for the building.

Each heating grid 90 comprises a supply header 91 to which the pipe 88 is connected for supplying hot water thereto.

A plurality of laterally extending pipe stubs or nipples 92 are welded along one side of the supply header 91 on approximately 15 inch centers, and a plurality of heat grid tubes 93 are slidably and sealably received over the pipe stubs 92 and are sealed thereto by means of O-rings or the like 94. The heat grid tubes 93 in one embodiment of the invention comprises 1 inch diameter furniture tubes having the ends thereof slightly flared and smooth on their inner surfaces for a tight sliding engagement with the pipe stubs and O-rings. The heat grid tubes 93 are connected at their other ends with a plurality of pipe stubs or nipples 95 welded along one side of an exhaust manifold 96, which in turn, is threadably connected with an elbow 97, which in turn, is joined with the return pipe 51.

The pipes 91, 93 and 96 are all preferably coated with a high temperature epoxy paint 98 to protect them from the corrosive effect of the concrete as it sets up, and also to prevent electrolysis after the concrete cures. The return pipe 51 and elbow 97 are preferably made of PVC plastic and are wrapped or covered with an approximately 4 inch thick layer of insulation 99, such as Zonolite or the like, and the insulation is wrapped with a layer of plastic 100 to hold the insulation in place.

A layer of insulation 101 is also provided beneath the floor of the building.

A typical building constructed in accordance with the invention may be about 200 feet long and 120 feet wide and have an extension or office area 19 on the side thereof about 30 feet wide and 114 feet long, with an overhead concrete storage area. Further, except for the section in the center of the building where the boilers are located, each heat grid 38 and 38' is approximately 30 feet wide and 20 feet long between each pair of center columns, and the heat grids 90 between the haunch columns are approximately 15 feet wide and 20 feet long. Therefore, approximately 40% of the floor area is heated. Additionally, the heated water is discharged from the boilers into the pipes after approximately a 40° to 80° temperature rise. The inlet temperature of the water going into the boilers at the beginning of boiler operation is about 70° to 75°, and the temperature is raised approximately 40° at a flow rate of about 80 gallons per minute. The temperature of water in the entire structure of the building will begin to rise until the inlet water temperature into the boilers is about 100°. At this time, the outlet temperature of water from the boilers will be about 140°, and the building will then have reached a temperature sufficient to operate the thermostat and turn off the boilers. The entire building structure, including the concrete floor, steel frame and water, will then tend to equalize in temperature, and the overall temperature will gradually drop until the temperature below the thermostat setting is reached, at which time the boilers and pump will again begin to operate. The boilers and pump motor are connected together electrically to the thermostat, so that any time the boilers come on, the pump comes on. If the pump does not come on for some reason, the boilers will shut down, and if this fails to function properly, then a temperature responsive switch connected with the boilers will shut down the boilers at a maximum water temperature of about 200° F.

The insulation and plastic surrounding the PVC return pipe not only prevents heat loss from the pipe into the ground, but also allows for relatively unimpeded movement or slippage between the pipe and the ground to enable the pipe to expand and contract with thermal changes.

The valve 89 at the base of each haunch column in the pipe 88 leading to each heat grid 90 enables the flow of hot water to the respective grids to be cut off, so that any of the heat grids 90 in the floor may be rendered inoperative as desired to control the temperature in various areas throughout the building. Further, the valves 49 at the end columns 15' in the center of the building enable the flow of hot water to be bypassed through pipes 50 to the return lines 51 and 51' and thence back to the pump and boilers without circulation of the water through the endmost columns and roof beams and heat grids in the floor at the sides of the building. If desired, a bypass pipe 50 and bypass valve 49 may be provided at the outlet of each of the center heat grids 38 to divert flow from the grids immediately to return lines 51 and 51' without flow upwardly through the center columns 15 and thence downwardly through the roof beams or rafter beams to the haunch columns and heat grids 90 at the sides of the building.

With a building constructed in accordance with the invention, the heating system maintains the temperature to only a 1° or 2° differential between a point 1 foot above the floor and a point 1 foot below the ceiling. Moreover, because of the fact that the floor and ceiling and walls of the building are all warm and radiant energy is used to heat the building, a temperature of about 65° can be maintained and persons within the building will stay quite comfortable.

Further, one of the boilers serves as a backup for the other to prevent freezing of the building in the event one of the boilers should fail for any reason.

The roof panels 21 are supported on top of purlins 102, which are in turn supported on top of the roof beams or rafters 13, and as seen in FIG. 3, the adjacent edges of roof panels 21 on opposite sides of the roof are spaced from one another and a longitudinally extending crown member or ridge 103 of a suitable heat destructable material, such as plastic or the like, is secured thereon for closing the space between the roof panels. This plastic crown member melts or breaks from the heat developed during the fire in the building, and accordingly, serves to vent the interior of the building to prevent the heat from building to a destructive level therein. Smoke is also vented from the building by this means, and thus potential smoke damage to the contents of the building can be reduced.

Further, as seen in FIG. 3, a water level switch 104 is provided in the adaptors or ridge beams 14, and has a float operated contact therein which closes when the water level falls below a predetermined level, usually set at about 6 inches below the top of the adaptors or ridge beams 14, to energize a solenoid operated valve 105 positioned in a pipe 106 leading to a suitable source of water for raising the water level in the building system. The water level switch may be of any suitable conventional construction, and may be the type supplied, for example, by Murphy Manufacturing Company of Tulsa, Oklahoma. When the water level reaches the desired level, the contacts of the switch 104 are opened, thus shutting the valve 105. The water level may fall, for example, when a fire occurs in the building and some of the water is converted to steam or lost through water discharge devices used for cooling other structural members of the building.

Figure 13:
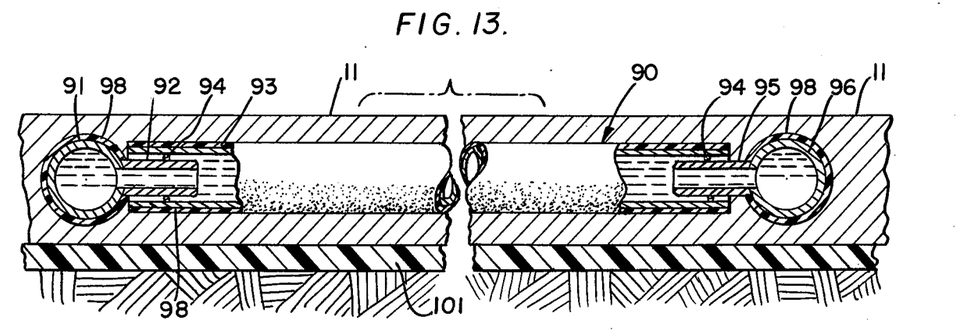
FIG. 13 is an enlarged view in section taken along line 13—13 in FIG. 2.

In addition to the water level switch 104, a plurality of heat sensing elements 107 are provided in desired locations throughout the building for sensing the temperature associated with a fire and sending a signal through wires 108 to the solenoid operated valve 105 to operate the valve to flood the water passages in the frame of the building and cause flow of water upwardly through openings 109 in the tops of the adaptors or ridge beams 14 into pipe fittings 110 and thence into apertured water discharge pipes 111 extending longitudinally of the building for effecting a flow of water downwardly over the roof panels 21 to maintain them cool and prevent destruction thereof due to the heat associated with a fire in the building. The heat sensing elements may be of any suitable type readily commercially available, and may, for example, be of the infrared type.

Figure 10:
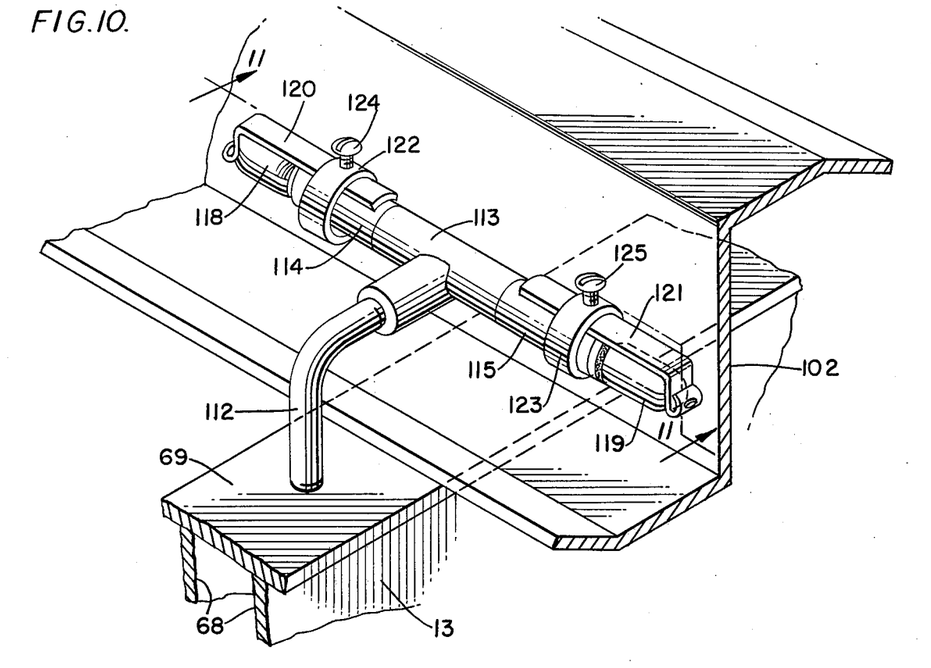
FIG. 10 is a greatly enlarged, fragmentary, perspective view showing one of the firefighting devices according to the invention for discharging water onto the purlins to keep them cool.
Figure 11:
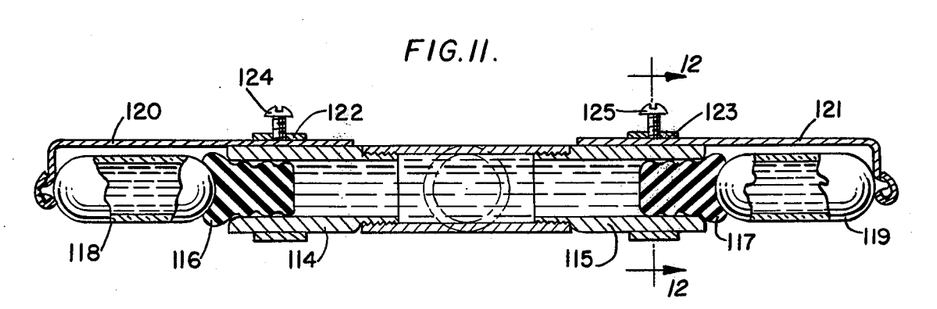
FIG. 11 is an enlarged view in section taken along line 11—11 in FIG. 10.
Figure 12:
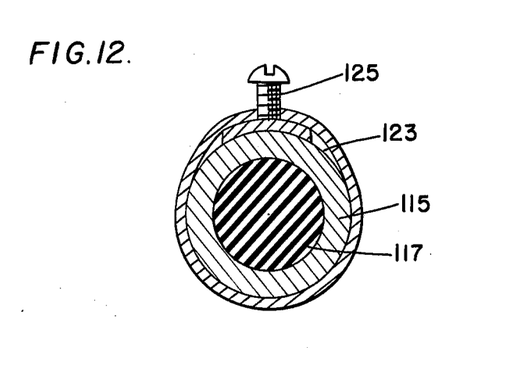
FIG. 12 is a further enlarged view in section taken along line 12—12 in FIG. 11.

Additionally, means are provided for keeping the roof purlins, eaves struts and wall girts cooled in the event of a fire in the building, and such means comprises a hole through the top plate 69 of the roof beams or rafters 13 adjacent the intersection thereof with the purlins 102. A threaded elbow 112 is fixed in each opening, and a T fitting 113 is suitably secured, as by threads or the like, to the elbow 112. Machined tubes 114 and 115, preferably of stainless steel and the like, are threaded into the opposite ends of the T-fitting 113, and rubber plugs 116 and 117, having grooved outer configurations, are pressed into the ends of the tubes 114 and 115 and are held therein by means of capsules 118 and 119 of glass or other suitable material filled to approximately 90% of their capacity with a liquid such as an antifreeze solution or the like, and held in position against the plugs 116 and 117 by means of L-shaped brackets 120 and 121 secured to the tubes 114 and 115 by means of circular clips 122 and 123 and associated set screws or the like 124 and 125.

In the event of a fire in the building, the liquid in the glass capsules 118 and 119 is heated and the resulting vapor pressure produced exceeds the tensile strength of the material comprising the capsules, causing them to break, and the similarly heated water in the T-fitting 113 expels the rubber plugs 116 and 117 from the ends of the tubes 114 and 115, thus effecting a flow of water along the channel defined by the purlins 102 to keep the purlins and also eaves struts and wall girts cool in the event of a fire to prevent their destruction.

As seen in FIG. 9, the bottom plate 70 of the roof beams or rafters 13 have upturned side edges 126 and 127 thereon defining channels which receive overflow and the like from the purlins, and this overflow is carried to the sides of the building.

Thus with the present invention, a very economical and effective building heating system is provided which additionally comprises means for preventing heat damage to the structural elements of the building in the event of a fire in the building.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:

1. Combined temperature control and firefighting system for a metal building having side walls and a roof, and wherein the building includes a metal frame structure supporting the walls and roof, said frame structure having hollow members defining water flow passages for circulation of water throughout the building structure to regulate the temperature of the building dependent upon the temperature of the circulated water, flow control means in the flow passages, heat responsive means positioned in the building for sensing the presence of a fire and the like in the building and connected with the flow control means to operate the flow control means in the event of a fire in the building to effect circulation of water through the hollow members to maintain them cool and prevent destruction thereof by the temperature associated with the fire, said building frame structure including roof purlins on which the roof is supported, and first water discharge means associated with the purlins and connected with the flow passages to discharge water on the purlins in the event of a fire in the building, said first water discharge means comprising a plurality of hollow pipes connected with the water flow passages in the frame structure and having frangible plug means associated therewith for precluding the flow of water therethrough during normal operation, said plug means being broken in the event of a fire occurring in the proximity thereof to enable discharge of water therefrom onto the roof purlins, each said frangible plug means comprising a rubber plug snugly fitted into the end of a hollow pipe, closing the pipe to flow of water therefrom, a hollow glass capsule filled to approximately 90% of its capacity with a liquid material and engaged against the rubber plug, a generally L-shaped bracket engaged with the capsule to hold it in position, and a circular clip engaged with the bracket and pipe to hold the bracket and plug securely in position during normal use, whereby the temperature associated with a fire heats the liquid in the capsule, increasing the pressure therein and fracturing the capsule, and enabling the rubber plug to be expelled from the pipe.

2. The combination of claim 1, further including water distribution means connected with the hollow members for receiving water therefrom and having means operative in response to the temperature associated with the fire for effecting discharge of water onto various surfaces of the building structure to prevent destruction thereof in the event of a fire.

3. The combination as in claim 2, wherein the flow control means comprises a solenoid operated valve positioned in the water flow passages and connected with a source of water, said valve being opened in response to the sensing of a fire to effect flow of water from the source into the hollow members and throughout the building structure.

4. The combination as in claim 1, wherein the hollow members include upright support columns and roof beams supported thereon, said support columns and roof beams having hollow interiors for circulation of water therethrough, said roof purlins supported on the roof beams and extending transversely thereto.

5. The combination as in claim 4, wherein second water discharge means are connected with the flow passages and extend to above the roof of the building to discharge water onto the roof.

6. The combination as in claim 5, wherein the support columns include a plurality of center columns, adaptor beams supported on the tops of the center columns, and said roof beams connected to the adaptor beams, said adaptor beams having a hollow interior, and means in the adaptor beams maintaining the water level therein at a predetermined elevation.

7. The combination as in claim 6, wherein said second water discharge means comprises a plurality of pipes connected with the adaptor beams and extending to above the roof of the building to convey water from the adaptor beams onto the roof in the event of a fire and the like.

* * * * *